United States Patent [19]

Yamazaki et al.

[11] 4,212,526

[45] Jul. 15, 1980

[54] VIEWFINDER FOR SINGLE LENS REFLEX CAMERA

[75] Inventors: Yasuo Yamazaki, Kawachinagano; Kazuo Kimura, Sakai, both of Japan

[73] Assignee: Minolta Camera Kabushiki Kaisha, Osaka, Japan

[21] Appl. No.: 67,199

[22] Filed: Aug. 16, 1979

[30] Foreign Application Priority Data

Aug. 22, 1978 [JP] Japan .................. 53-102537

[51] Int. Cl.² .................................................. G03B 13/08
[52] U.S. Cl. .................................................. 354/225
[58] Field of Search .................... 350/8, 27, 48, 55; 354/150, 152, 151, 219, 224, 225, 155, 153, 154

[56] References Cited

U.S. PATENT DOCUMENTS

| | | | |
|---|---|---|---|
| 2,323,005 | 6/1943 | Bertele | 354/225 |
| 2,980,001 | 4/1961 | Sauer et al. | 354/155 |
| 3,656,421 | 4/1972 | Ataka | 354/155 |
| 3,783,764 | 1/1974 | Baker | 354/150 |
| 3,860,940 | 1/1975 | Baker | 354/225 X |
| 4,063,261 | 12/1977 | Kuboshima | 354/225 |

FOREIGN PATENT DOCUMENTS

| | | | |
|---|---|---|---|
| 432213 | 3/1948 | Italy | 354/152 |
| 1010226 | 11/1965 | United Kingdom | 354/219 |

Primary Examiner—Donald A. Griffin
Attorney, Agent, or Firm—Jackson, Jones & Price

[57] ABSTRACT

A pentagonal roof reflecting viewfinder assembly for a single lens reflex camera is provided. A focussing plate and a first and second reflecting mirror are part of the assembly. The improvement includes a third aspherical reflecting mirror having a lesser curvature at its marginal portions than adjacent an apex of the surface. The apex being positioned above the reflective surface of the third mirror. An ocular is provided having at least two lens elements with one of the lens elements being tilted relative to the optical axis of the ocular.

6 Claims, 38 Drawing Figures

VIEWFINDER FOR SINGLE LENS REFLEX CAMERA

BACKGROUND OF THE INVENTION

1. Field of the Invention

The present invention relates to an improved viewfinder optical system having a pentagonal roof reflecting mirror assembly and more particularly to a totally reflecting viewfinder system providing a high magnification with a relatively low distortion of the visual field for single lens reflex cameras.

2. Description of the Prior Art

The camera industry today is striving to provide lighter and more compact cameras to meet the consumer demand. At the same time, the manufacturers of cameras are being required to maintain the operating and optical capabilities of their prior cameras and where possible to improve the same. An important area for improvement within these design parameters is the viewfinder. The viewfinder is required not only to provide a relatively bright and optically acceptable image, but to further meet additional requirements of magnification and weight.

Traditionally, high quality 35 mm cameras have utilized a pentaprism to maintain the high quality optical characteristics that is expected of through the lens viewfinders. Recently in an effort to reduce the considerable weight of a pentaprism, there have been suggestions to replace it with a hollow pentagonal roof type refracting mirror assembly. While these viewfinders realize a considerable saving in weight, they have a disadvantage in that the optical path length is relatively long and the magnification of the visual field thereof is reduced in comparison with a pentaprism type viewfinder.

There have been suggestions to form a third reflecting mirror in a roof type mirror assembly into a concave spherical mirror to help eliminate the reduction in magnification and to shorten the optical path length. Problems have existed, however, in that an image inclination or tilt occurs and there is a difference in diopter power between the upper and lower portions of the visual field. These problems manifest themselves in that a lateral line in the visual field will be curved while a longitudinal line thereof will be tilted due to distortion resulting from the inherent geometry of the system.

U.S. Pat. Nos. 3,783,764 and 3,860,940 disclose a viewfinder for a foldable reflex instant camera having an aspherical concave mirror with a tilting of an ocular lens.

Of some interest is the Japanese Publication Sho49-12602 (1974) which discloses a viewfinder for a single lens reflex camera having a convex mirror to increase the viewfinder image magnification. Cited of general interest is U.S. Pat. No. 4,063,261 which discloses a concave reflecting mirror for increasing image magnification. The prior art is still seeking to provide an optimized viewfinder for modern lightweight cameras.

SUMMARY OF THE INVENTION

The present invention provides a hollow pentagonal roof type reflecting mirror assembly for a single lens reflex camera which includes a focussing plate for realizing the object image from the objective lens system, an ocular, and a pentagonal roof reflecting mirror assembly for transmitting the object image from the focussing plate to the ocular.

An object of the present invention is to provide a high magnification ratio with a minimum possible image inclination and distortion of the visual field. The viewfinder optical system of the present invention incorporates a third reflecting mirror in the pentagonal roof type reflecting mirror assembly having an aspherical surface with a curvature less than that adjacent an apex or vertex for a marginal portion remote from the apex portion. The apex is positioned above the intersection of the third reflecting mirror and the collimation axis of the viewfinder. The ocular is separated into a first convex lens group and a second concave lens group sequentially from the focussing plate or reticle and at least one of the lens groups is tilted to form an elevation angle with respect to the collimation axis.

The objects and features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

DESCRIPTION OF THE PREFERRED EMBODIMENTS

The following description is provided to enable any person skilled in the optical and camera arts to make and use the invention and sets forth the best modes contemplated by the inventors in carrying out their invention. Various modifications, however, will remain readily apparent to those skilled in these arts since the generic principles of the present invention have been defined herein specifically to provide an improved viewfinder that can be manufactured in a relatively economical manner.

Figure 1:
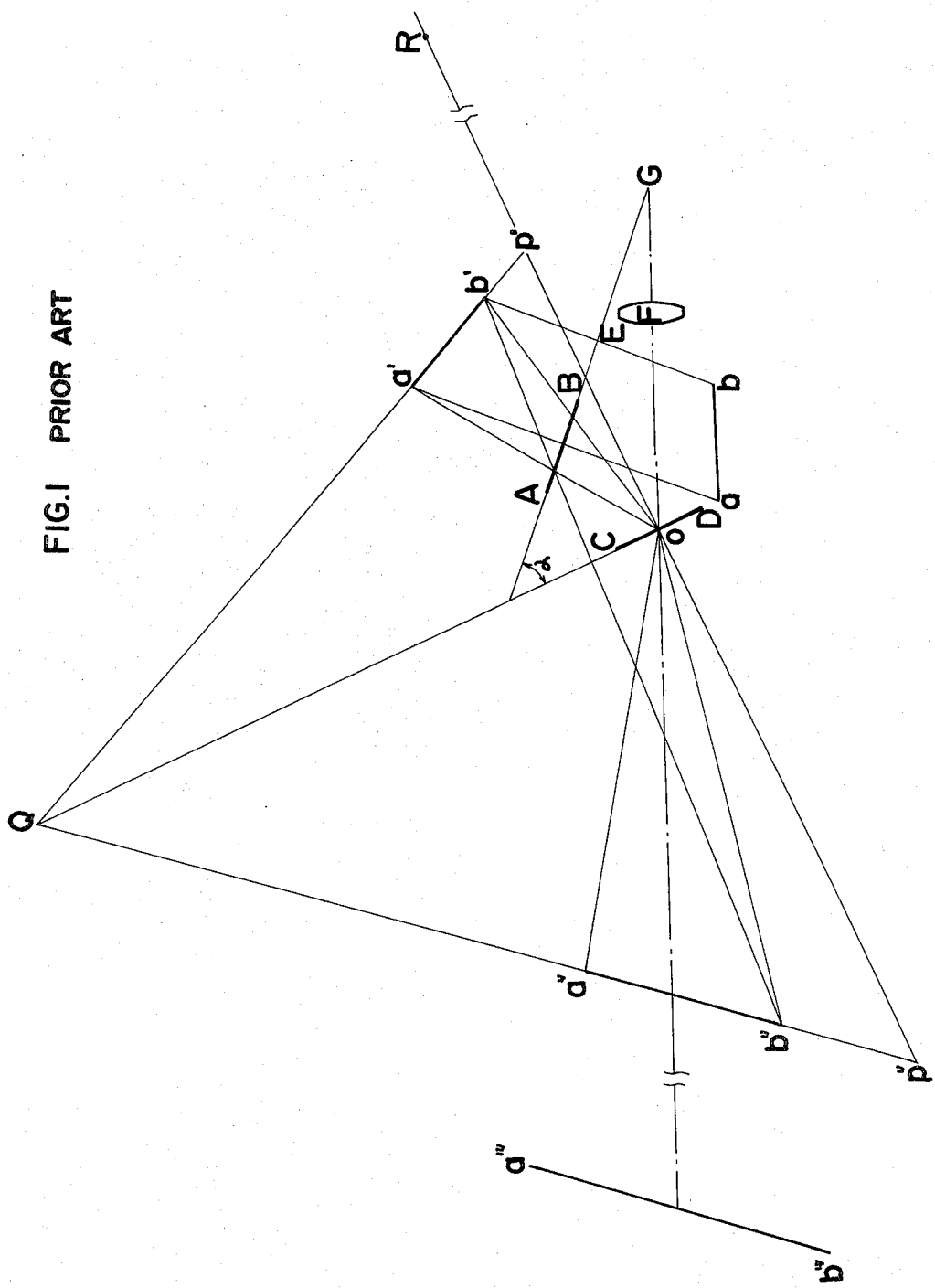
FIG. 1 discloses the image formation of a modified prior art viewfinder optical system wherein a concave spherical surface is used as a third reflecting mirror.

Referring to FIG. 1, a schematic diagram is utilized to show an image formation according to a modified prior pentagonal roof type reflecting mirror assembly. In this regard, a convex spherical mirror lens shown in Japanese publication Sho 49-12602 has been modified as a concave spherical mirror for the third reflecting mirror and the drawing illustrates the image inclination and generation of distortion as a result of the Scheimpflug law. Reference is made to U.S. Pat. No. 3,972,584 simply as a reference with regard to the Scheimpflug law and the disclosure of that patent, though not essential for an understanding of the present invention, is hereby incorporated by reference to facilitate a greater understanding of the background of the present invention.

Referring to FIG. 1, line ab represents an image focussed on a focussing plate; line $\overline{AB}$ is a ridge line of a dach or roof reflecting surface of a pentagonal roof type reflecting mirror; line $\overline{CD}$ is a concave spherical mirror forming a third reflecting mirror; element F is an ocular and line $\overline{OG}$ is an optical axis of the viewfinder including the ocular F. An image $\overline{a'b'}$ of the image $\overline{ab}$ focussed by the dach reflecting surface is formed by the spherical mirror into $\overline{a''b''}$ on a line ($\overline{QP''}$) which is defined by an intersection Q of an extension line from the image $\overline{a'b'}$, a tangent surface of the spherical mirror $\overline{CD}$ on the optical axis G, and the paraxial image point P'' which is formed by the spherical mirror $\overline{CD}$ from the intersection P' between a line from the apex O of the spherical mirror $\overline{CD}$ to a center R thereof and the extension line of line $\overline{a'b'}$. The image $\overline{a''b''}$ is enlarged by the ocular F, and is focussed into an image $\overline{a'''b'''}$ through the ocular F. The image $\overline{a'''b'''}$ is not only enlarged in comparison with the image $\overline{a'b'}$ but has an image inclination with respect to the collimation axis G. Further, a magnification of position b' is larger than that of a'. Accordingly, in the image $\overline{a'''b'''}$ an asymmetrical distortion in the vertical direction of the image is generated, and at the same time, since the optical axis G is inclined with respect to a line passing through the center R of the spherical mirror $\overline{CD}$, the lateral line in the visual field is viewed as curved downwardly.

Figure 2A:
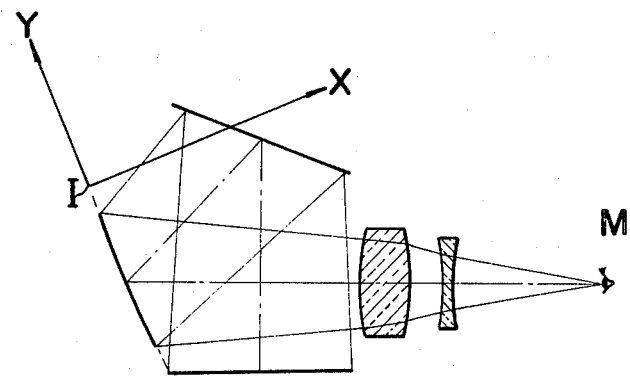
FIG. 2(a) shows a viewfinder optical system wherein a third reflecting mirror is having an aspherical surface whose apex is positioned at a point, I, above the effective reflex region of the third reflecting mirror.
Figure 2B:
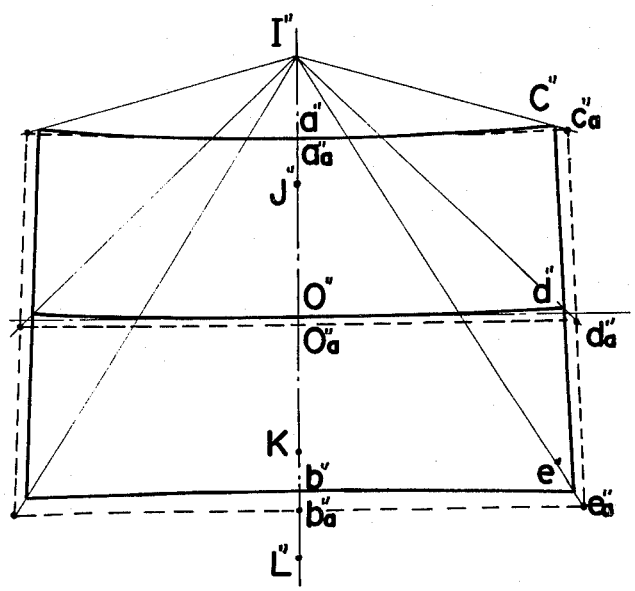
FIG. 2(b) is a diagram showing a comparision of an image inclination and a visual field image according to the optical system shown in FIG. 2(a) with a viewfinder optical system having a third reflecting mirror formed with a spherical surface.

FIGS. 2(a) and 2(b) disclose a difference between cases where the third reflecting mirror is spherical and aspherical. In the case of an aspherical mirror, an apex or vertex thereof is positioned at I, above the effective reflecting surface of the third reflecting mirror. In FIG. 2(b), the solid lines $a''b''c''d''e''o''$ represent a visual field image when the third reflecting mirror has a spherical surface while the dotted lines $a''_a, b''_a, c''_a, d''_a, e''_a, o''_a$ represent a visual field image for the case where the third reflecting mirror is formed of an aspherical surface having the apex positioned at I, and the image points $a''_a, b''_a, c''_a, d''_a, e''_a,$ and $o''_a$ exist on respective lines from position I'' to the respective points of the visual field. In this case, the position I'' is an intersection defined by the image surface of the visual field and a phantom extension line passing through the eye M and the apex I and extending behind the third reflecting mirror. As is apparent from FIG. 2(b), if the third reflecting mirror is formed of an aspherical surface, the condition of the distortion is varied in comparison with the use of a spherical surface, and a degree of variation is different according to both the configuration of the aspherical surface and the position of the apex of the aspherical surface.

Figure 3A:
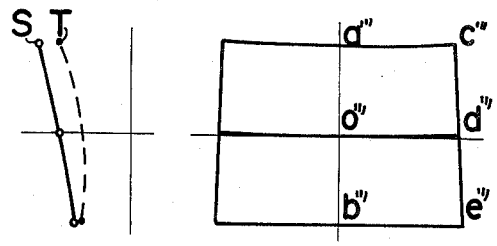
FIG. 3(a) shows an image inclination and a visual field image according to a prior art viewfinder optical system wherein the third reflecting mirror is formed with a spherical surface.

FIG. 3(a) shows a case wherein the third reflecting mirror is composed of a spherical surface, and the resultant visual field image is reproduced by dotted lines in FIGS. 3(b) to 3(i) for a ready comparison.

Figure 3B:
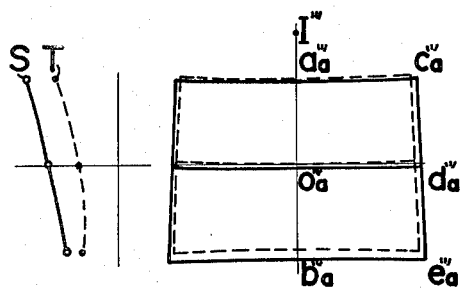
FIGS. 3(b) to 3(i) show image inclinations and visual field images according to various constructional configurations and positions of apexes of third reflecting mirrors which are formed with aspherical surfaces, respectively.
Figure 3C:
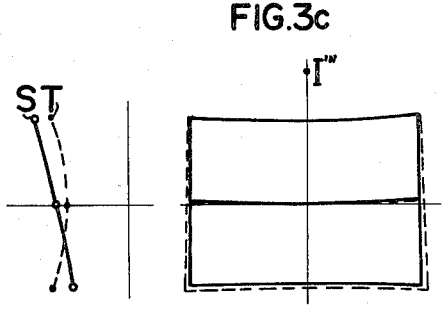
Figure 3D:
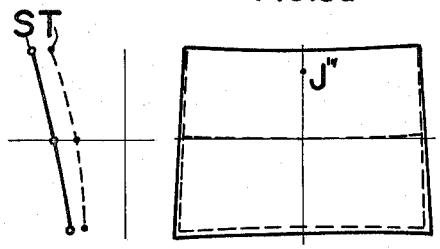
Figure 3E:
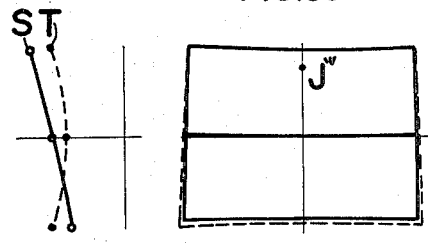
Figure 3F:
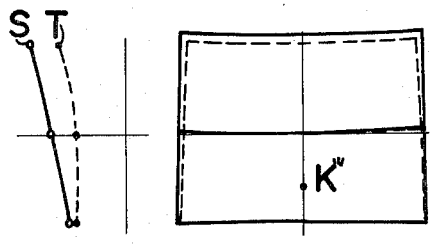
Figure 3G:
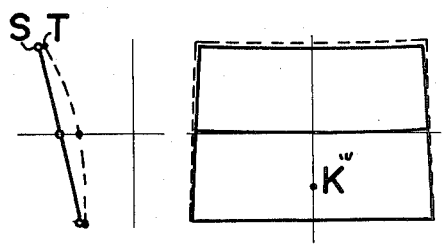
Figure 3H:
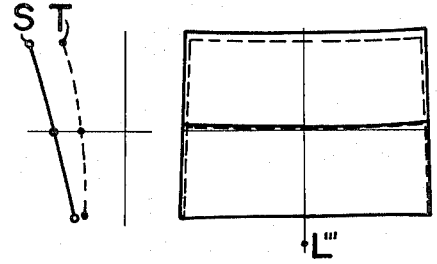
Figure 3I:
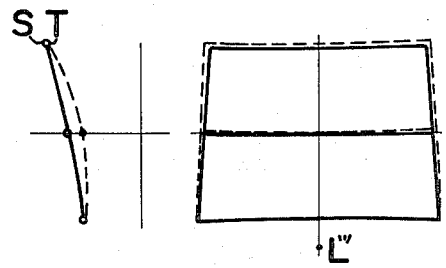

FIGS. 3(b) to 3(i) show distortions of the visual field images and image inclinations in cases wherein the third reflecting surface is composed of an aspherical surface. FIGS. 3(b), 3(d), 3(f) and 3(h) show results in which the curvature of the marginal portion of the aspherical surface is greater than that of the portion adjacent to the apex and FIGS. 3(c), 3(e), 3(g) and 3(i) show results in which the curvature of the marginal portion thereof is lesser than that of the portion adjacent to the apex. FIGS. 3(b) and 3(c) show cases where the apex of the aspherical surface is positioned at, I, above the effective reflecting region. FIGS. 3(d) and 3(e) show cases wherein the apex of the aspherical surface is positioned at J above the view axis within the effective reflecting region. FIGS. 3(f) and 3(g) show cases where the apex of the aspherical surface is positioned at K below the collimation axis within the effective reflecting region and FIGS. 3(h) and 3(i) show cases where the apex of the aspherical surface is positioned at L below the effective reflecting region.

The results shown in FIGS. 3(c) and 3(e) are desirable because in these figures the image inclination of the average image between the sagittal image, S, and the tangential image, T, is relatively small and the distortion of the visual field is relatively compensated. FIGS. 3(f) and 3(h) also show a small image inclination of the longitudinal line but the inclination of the lateral line still remains relatively extreme. As can be seen the image inclination and the distortion of the visual field can be relatively compensated when the curvature of the marginal portion is lesser than that of the apex portion and the apex of the aspherical surface is positioned above the collimation axis. However, a problem still exists in that a slight distortion of the lateral line occurs as can be viewed in FIGS. 3(c) to 3(e).

Figure 4A:
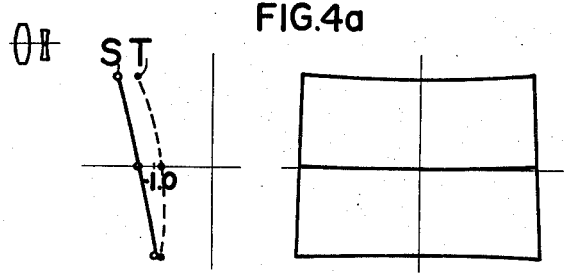
FIGS. 4(a) to 4(i) show image inclinations and visual images according to various relationships between the ocular and collimation axis.
Figure 4B:
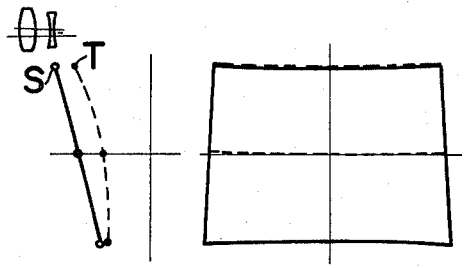
Figure 4C:
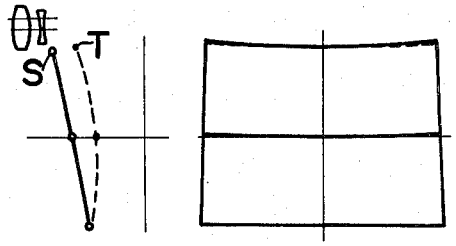
Figure 4D:
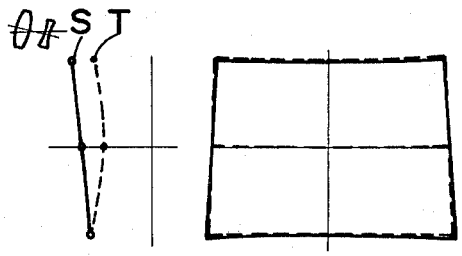
Figure 4E:
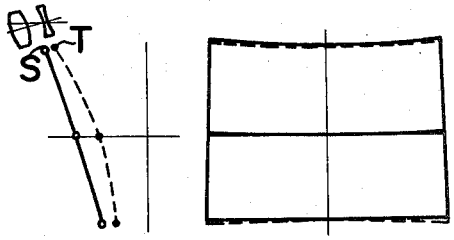
Figure 4F:
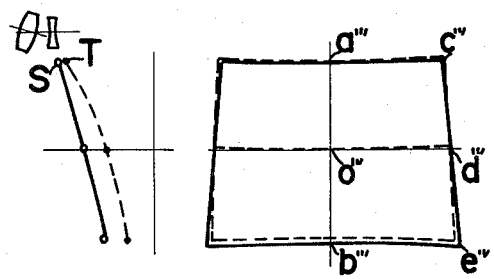
Figure 4G:
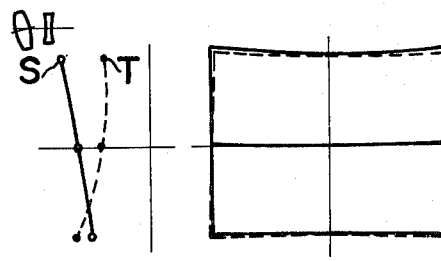
Figure 4H:
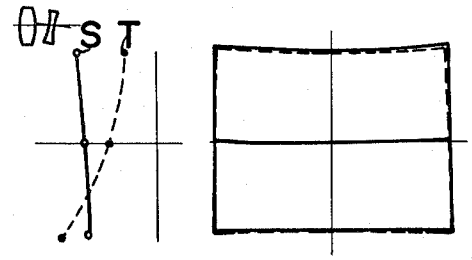
Figure 4I:
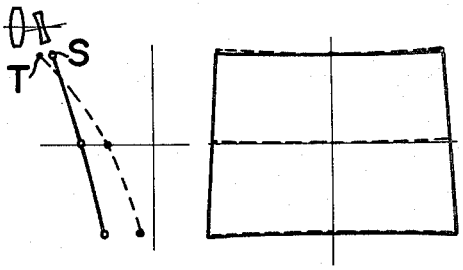

FIGS. 4(a) to 4(i) show the image inclinations and the distortions of a visual field according to various effects of the arrangement of the ocular with respect to the collimation axis when the third reflecting mirror is composed of a spherical surface. In each figure thereof, an arrangement of the ocular is depicted obliquely upward on the left hand side. FIG. 4(a) shows a case wherein the first and second lens groups are both positioned coaxially on the collimation axis. FIGS. 4(b) and 4(c) show cases wherein the ocular is decentered up and down, respectively. FIGS. 4(d) and 4(e) show cases wherein the first and second lens groups are tilted with respect to the paraxial axis by the same angle for evaluation and inclination, respectively. FIGS. 4(f) and 4(g) show cases wherein only the first lens group is arranged so as to have an elevation or an inclination, and FIGS. 4(h) and 4(i) show cases wherein only the second lens group is arranged so as to have an elevation or an inclination.

FIGS. 4(d), 4(f) and 4(h) show states in which the image inclination is not too extreme and the curvature of the lateral line is relatively well compensated for in addition to the inclination of the longitudinal line. In view of this, it has been found to be effective to provide at least one lens group separated into a first and second lens group in the ocular to have an elevation with respect to the collimation axis.

The present invention offers a viewfinder optical system for single lens reflex cameras in which the image inclination and the distortion of the visual field thereof are well compensated for by the combination of the desirable results obtained in FIGS. 3 and 4, in accordance with the above-described two principles.

Preferred embodiments of the present invention will be hereinafter described in reference to the accompanied drawings. The optical dimensions used therein are specified in the following table.

TABLE 1

|  |  | R (mm) | D (mm) | nd | νd |
|---|---|---|---|---|---|
|  |  |  | $D_{12}=51.7$ |  |  |
| third mirror |  | $R_1 = -551.602$ |  |  |  |
|  | first lens surface | $R_2 = 24.711$ | $D_2 = 28.0$ |  |  |
| Convex ocular lens |  |  | $D_3 = 5.8$ | 1.62041 | 60.29 |
|  | second lens surface | $R_3 = -88.708$ |  |  |  |
|  |  |  | $D_4 = 4.3$ | 1.0 |  |
|  | first lens surface | $R_4 = -49.275$ |  |  |  |
| Concave ocular lens |  |  | $D_5 = 1.2$ | 1.733 | 28.24 |
|  | second lens surface | $R_5 = 70.075$ |  |  |  |
|  |  |  | $D_6 = 18.0$ | 1.0 |  |

In Table I, the radius of curvature $R_1$ of the third reflecting mirror is $-551.602$ mm, and is represented as a spherical surface. This is a representation for a better understanding, in which the aspherical surface is designated by the curvature near the apex. Coefficients $\epsilon$, Co, and Ci representing an aspherical surface in the equation below are specified in the following embodiments.

$$X = f(Y, Z) = \frac{Co\phi^2}{1 + (1 - \epsilon Co^2\phi^2)^{\frac{1}{2}}} + \Sigma ci \cdot \phi^{2i}$$

wherein: $\phi^2 = Y^2 + Z^2$

The resultant focal distance of the third reflecting mirror and the ocular specified in the above scheme is 66.5 mm. The magnification becomes at least 0.8 times as an image magnification if a center diopter is established at about 1 diopter.

Figure 5A:
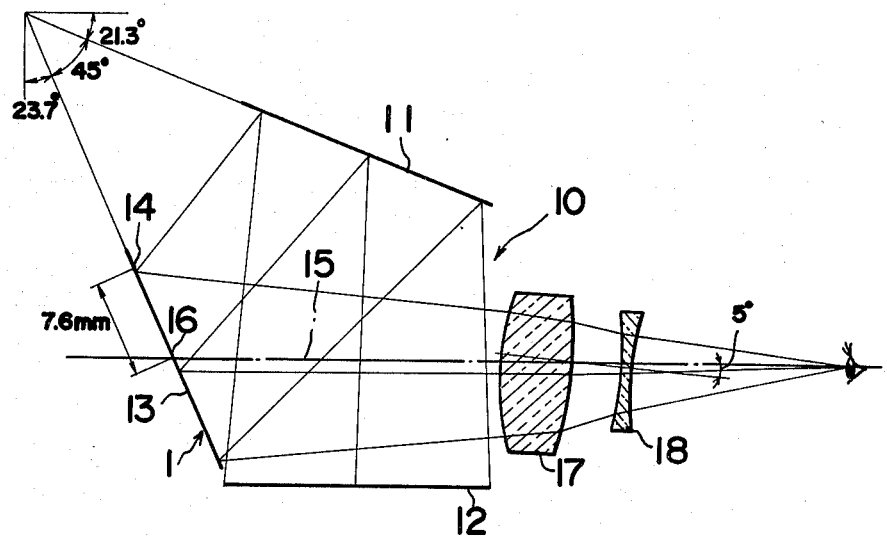
FIGS. 5(a), 6(a), 8(a), 9(a), 10(a), 11(a) and 12(a) show various embodiments of optical systems according to the present invention.

FIG. 5(a) shows a first embodiment of a viewfinder optical system according to the present invention. In this embodiment, a roof ridge line 11 of a pentagonal roof type reflecting mirror 10 forms an angle 21.3° with respect to a focussing plate 12 horizontally disposed, and an angle of 45° is formed by a tangent surface at an apex 14 of an aspherical surface of a third reflecting surface 13 and the roof ridge 11. Aspherical coefficients of the third reflecting surface 13 are as follows:

$\epsilon = 1$,
$C0 = -1.8129 \times 10^{-3}$
$C_1 = 0$
$C_2 = 1.0 \times 10^{-7}$
$C_3 = 2.9 \times 10^{-10}$ The apex 14 is positioned 7.6 mm from an intersection 16 between a view axis 15 and the effective reflecting region of the third reflecting mirror 13. A convex lens 17 and concave lens 18 which form the ocular are disposed at an elevation of 5° with respect to the collimation axis.

Figure 5B:
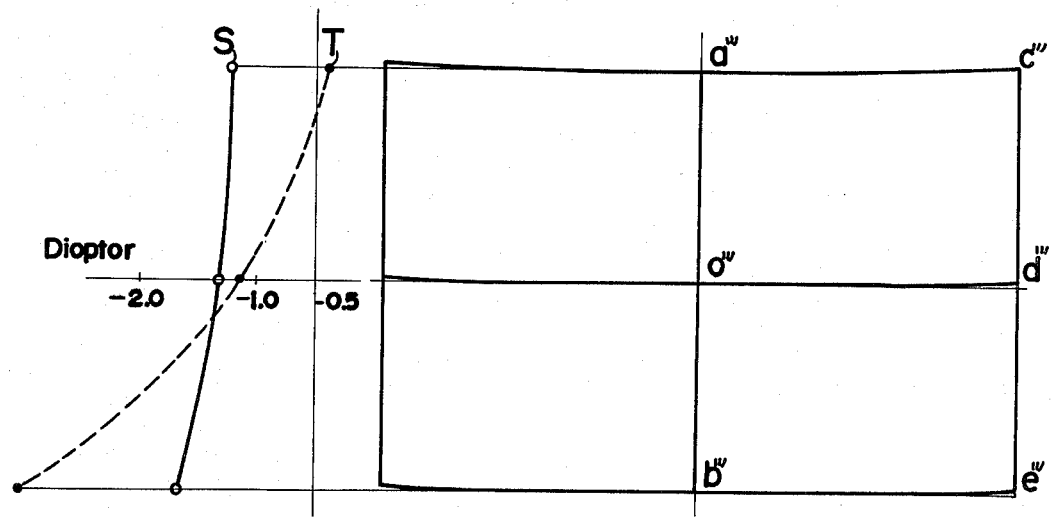
FIGS. 5(b), 6(b), 8(b), 9(b), 10(b), 11(b) and 12(b) show corresponding image inclinations and visual field images according to respective embodiments

FIG. 5(b) shows an image inclination and a view or visual field. Since the elevation angle of the ocular with respect to the collimation axis is large, the inclination tends to be somewhat excessively compensated for, and the diopter in the upper portion of the visual field is somewhat excessively remote as compared with the lower portion thereof. However, there is no problem in practical use. A little inclination of the longitudinal line c'''e''' and the distortion of the lateral line in the visual field exists. In contrast, the center of the visual field is moved slightly downward to thereby cause a so-called "squint" phenomenon. This can be eliminated by transferring the overall ocular downwardly in parallel, by reducing an angle of the roof ridge line 11 with respect to the horizontal line or by also transferring the roof ridge line 11 with a parallel upward movement. Further, it can be effective to erect the third reflecting mirror to a more upright position, to move it on the ocular side or to move the focussing plate with a parallel forward movement.

Figure 6A:
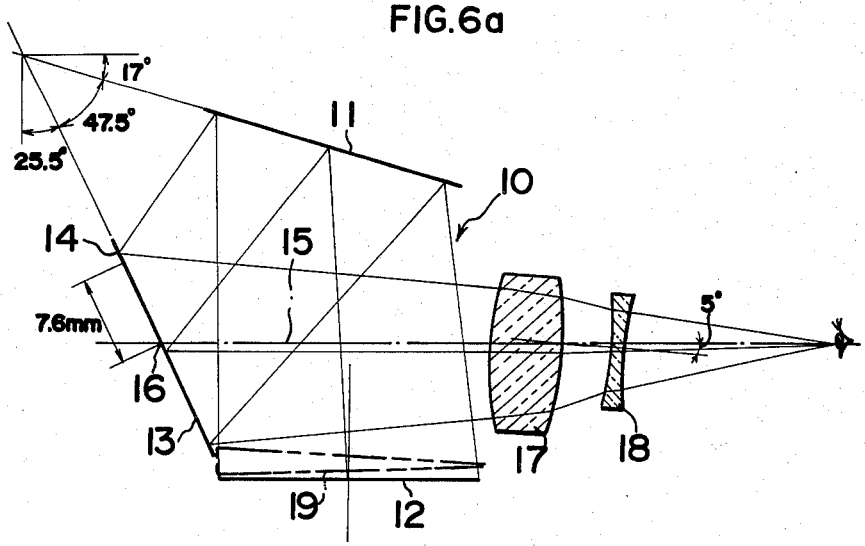
Figure 6B:
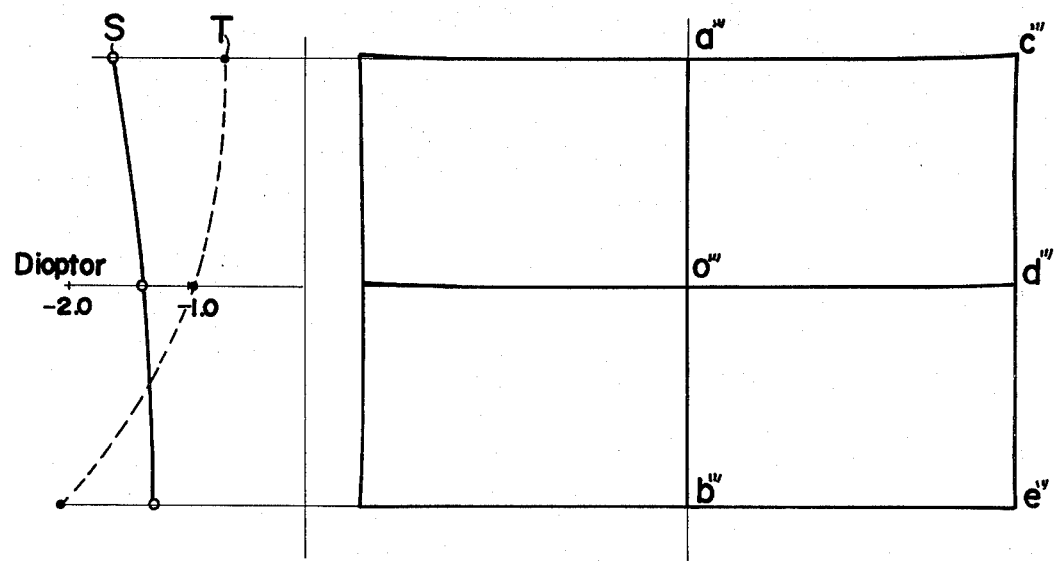

FIG. 6(a) shows a second embodiment of the optical system according to the present invention. In this embodiment, a third reflecting mirror 13 is composed of an aspherical surface having aspherical coefficients as follows:

$\epsilon = 1$
$C0 = -2.0 \times 10^{-3}$
$C_1 = 1.0 \times 10^{-5}$
$C_2 = 5.0 \times 10^{-8}$
$C_3 = 1.7 \times 10^{-10}$ An angle 47.5° is formed by a tangent surface at an apex of the aspherical surface and a roof ridge line. The image inclination and distortion of the visual field in this embodiment is shown in FIG. 6(b) and represents an improvement over the embodiment shown in FIG. 5(b).

In the second embodiment, unless the direction of light flux from the center of the focussing plate 12 (the center of the visual field) to the eye is parallel to an optical axis of an objective lens (not shown) which is reflexed at a right angle by a movable mirror (not shown), when the eye moves up and down, a difference is generated in the eclipse direction of the light flux of the objective lens. Particularly when a microprism or the like is provided at the center of the focussing plate 12, such a difference is considerable. Therefore, a wedge-shaped prism 19 may be inserted as shown by dotted lines in FIG. 6(a) to thereby achieve the parallelism between the direction of the above described emitting light from the focussing plate 12 and the optical axis of the above described objective lens.

Figure 7A:
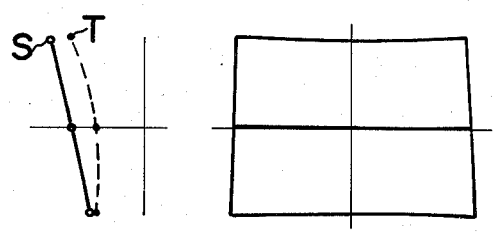
FIGS. 7(a), 7(b) and 7(c) show corresponding image inclinations and visual field images according to various angles formed by a surface tangent to the vertex of the aspherical surface of the third reflecting mirror and the roof ridge line.
Figure 7B:
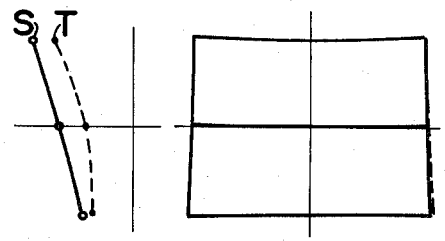
Figure 7C:
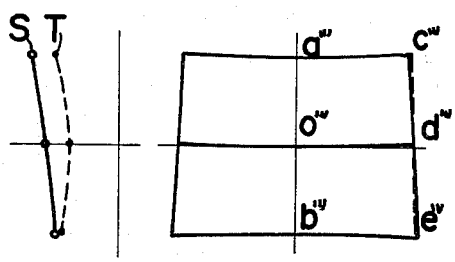

Furthermore, in connection with the second embodiment, FIGS. 7(a), 7(b) and 7(c) illustrate the reason why the angle formed by the tangent surface at the apex 14 of the aspherical surface and the roof ridge line 11 is set at 47.5°. FIGS. 7(a), 7(b) and 7(c) further show image inclinations and visual fields in cases where the angles formed by the tangent surface at the apex of the aspherical surface and the roof ridge line are determined at 45°, more than 45° and less than 45°, respectively. The case shown in FIG. 7(b) wherein the angle is larger than 45°, is most desirable because the inclination of the longitudinal line thereof is well compensated. Thus, taking such a principle into consideration, in addition to the two principles aforedescribed, the distortion of the visual field can be further reduced. The dotted lines viewed in FIGS. 7(b) and 7(c) represent the visual field image of FIG. 7(a) for comparison.

Figure 8A:
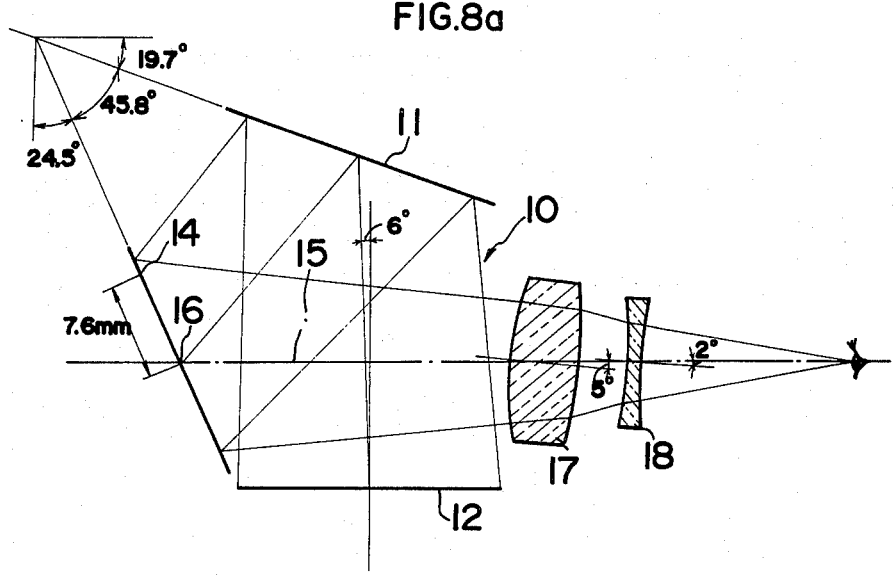
Figure 8B:
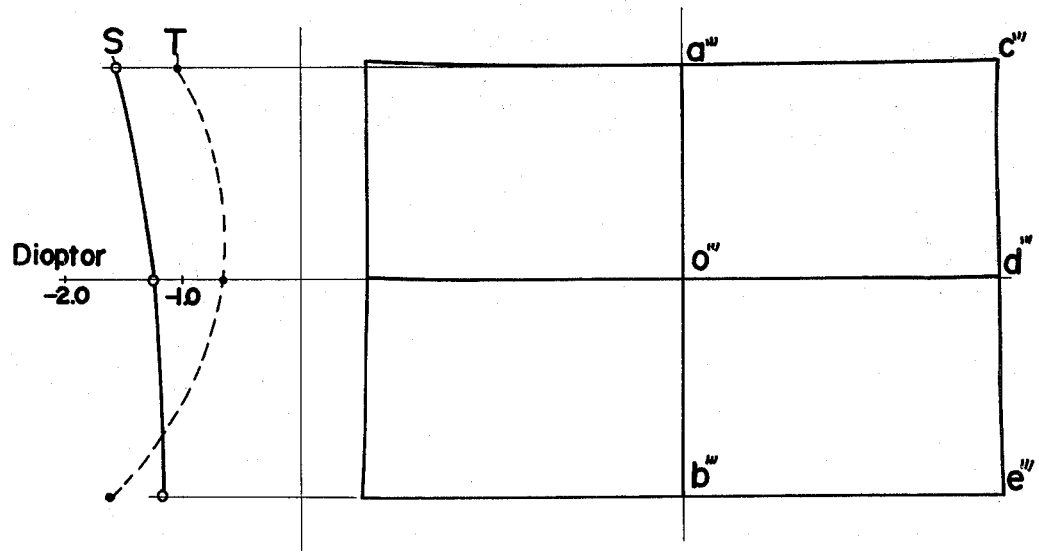

FIG. 8(a) shows a third embodiment in which a difference in the inclination between the first lens group and the second lens group of the ocular effects the image inclination and the distortion of the image. The convex lens 17 and the concave lens 18 are tilted to provide elevations of 5° and 2° with respect to the collimation axis. Aspherical coefficients of the third reflecting mirrors 13 are specified as follows:

$\epsilon = 1$
$C_0 = -1.8129 \times 10^{-3}$
$C_1 = -1.0 \times 10^{-5}$
$C_2 = 5.5 \times 10^{-8}$
$C_3 = 3.8 \times 10^{-10}$ An angle formed by a tangent surface at the apex 14 of the aspherical surface and a roof ridge line 11 is established at 45.8°. The direction of the light flux emitting from the center of the focussing plate 12 is slanted at an angle of 1.6° with respect to the optical axis of the objective lens. Within the scope of the inclination, the effect can be eliminated by intentionally producing the so-called "squint" arrangement. FIG. 8(b) shows the result according to this embodiment. The distortion of the visual field is substantially the same as that shown in FIG. 7(b). The image inclination is more symmetrical up and down than that shown in FIG. 7(b) for the average of the image surfaces.

Figure 9A:
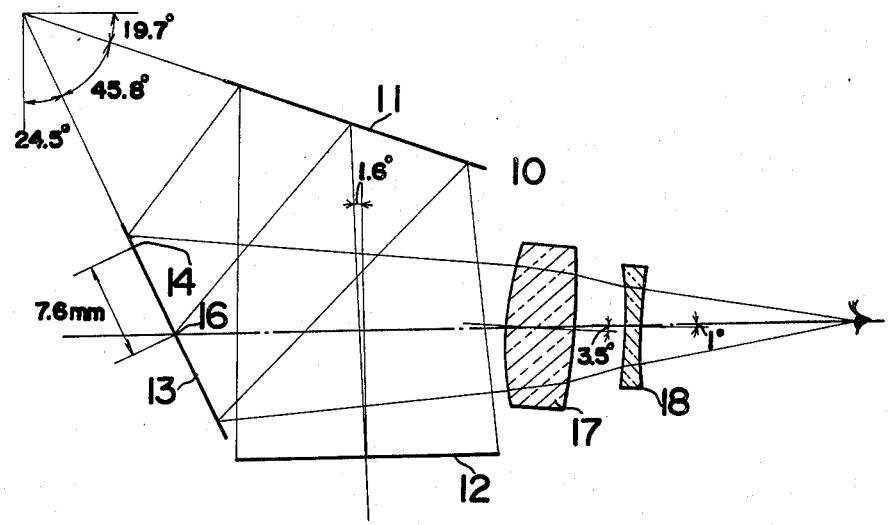
Figure 9B:
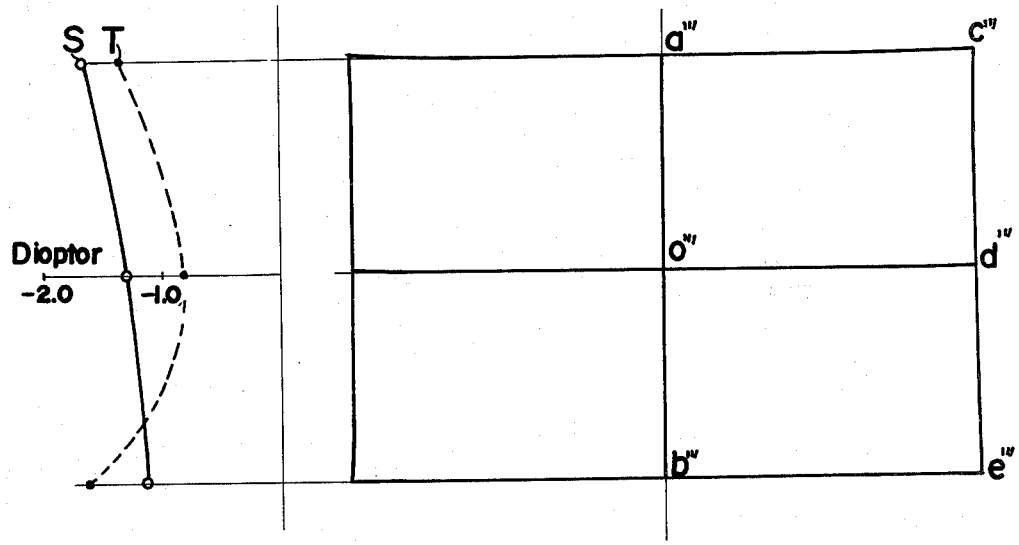

FIG. 9(a) shows a fourth embodiment of an optical system in which an inclination of the ocular is smaller than that shown in FIG. 8(a). A convex lens 17 is inclined at an angle of 3.5°, and a concave lens 18 is inclined at an angle of 1.0°, both lenses are arranged to have an elevation with respect to the collimation axis. The aspherical coefficients and other conditions of the third reflecting mirror are the same as those in the FIG. 8(a) embodiment.

A comparison between the results of the embodiment shown in FIG. 9(a) and those of the third embodiment, discloses that there is hardly any difference between the distortion of the image and only a little difference in the tangential image, T, exists.

Figure 10A:
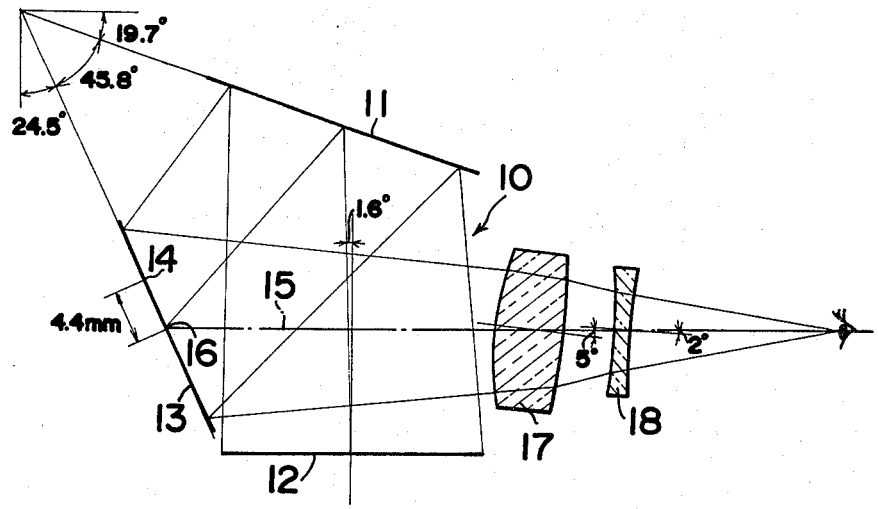
Figure 10B:
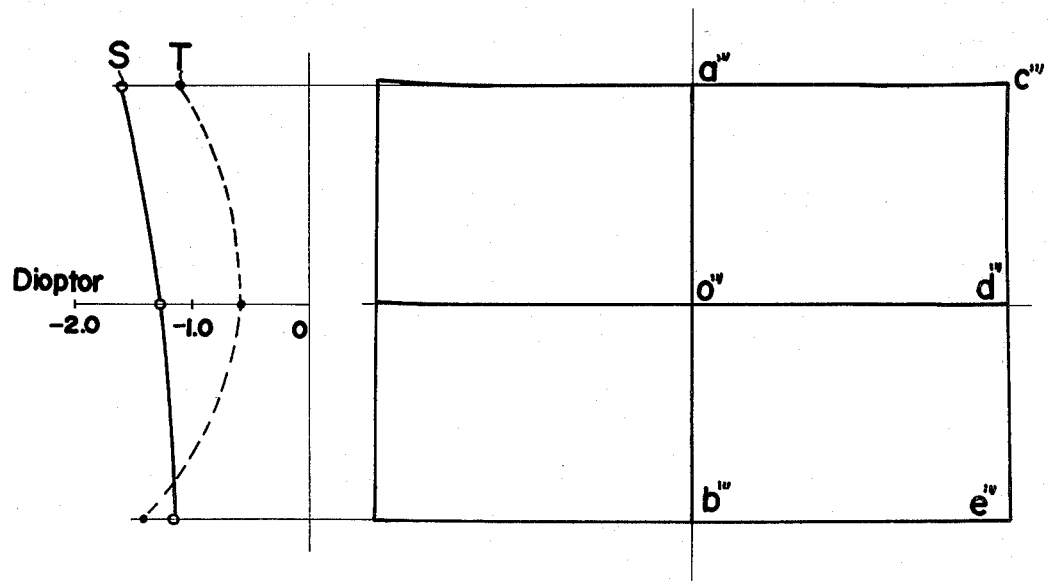
Figure 11A:
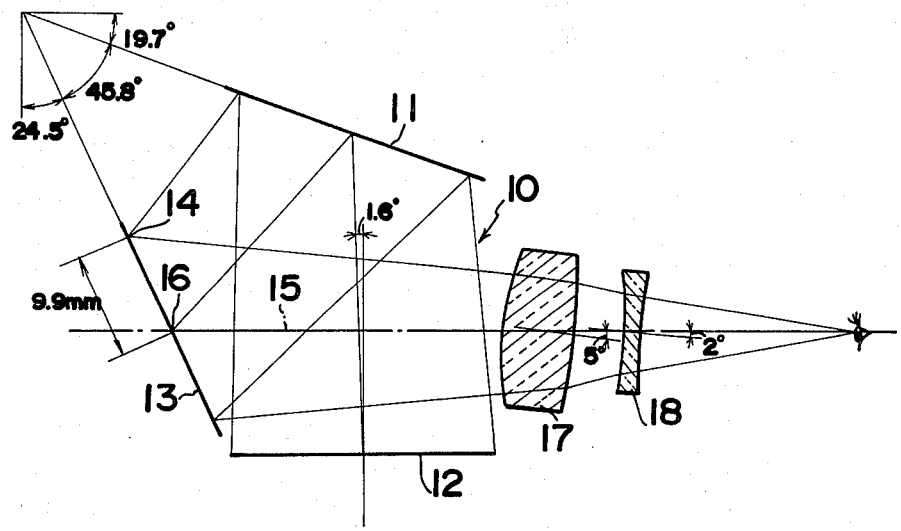
Figure 11B:
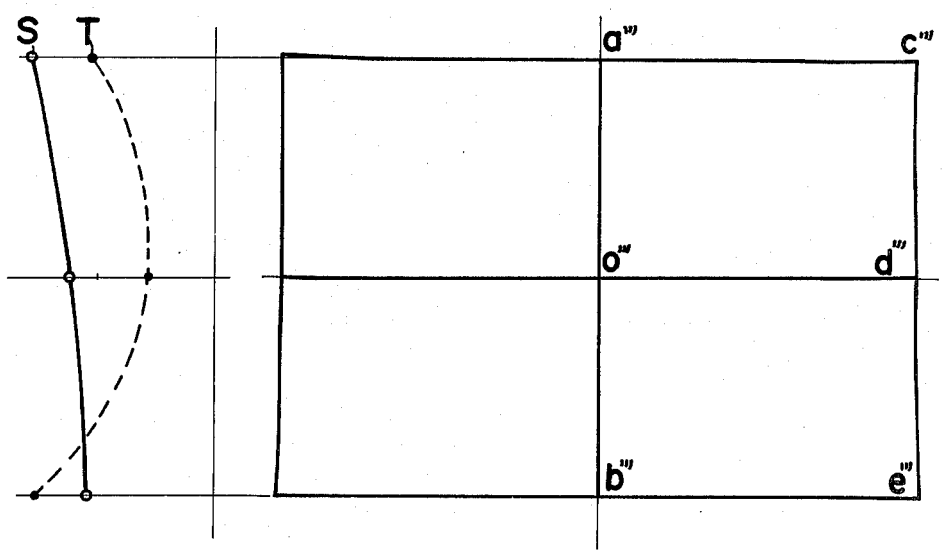

FIGS. 10(a) and 11(a) show fifth and sixth embodiments, respectively, wherein the apex of the aspherical surface of the third reflecting mirror is varied. In these embodiments, the respective distances from the apex of the third reflecting mirror 13 to an intersection defined by a collimation axis and the aspherical surface are at 4.4 mm and 9.9 mm, respectively. In both of these embodiments, the apex 14 exists within the effective reflecting surface of the third reflecting mirror 13. The aspherical surfaces of the third reflecting mirrors 13 of the fifth embodiment is:

$\epsilon = 1$
$C_0 = -1.8129 \times 10^{-3}$
$C_1 = -1.0 \times 10^{-4}$
$C_2 = 0$
$C_3 = 1.0 \times 10^{-10}$
$C_4 = 2.7 \times 10^{-13}$ The aspherical surfaces of the third reflecting mirrors 13 of the sixth embodiment is:

$\epsilon = 1$
$C_0 = -1.8129 \times 10^{-3}$
$C_1 = -1.0 \times 10^{-5}$
$C_2 = 5.5 \times 10^{-8}$
$C_3 = 3.8 \times 10^{-10}$ In comparing between the results shown in FIGS. 10(b) and 11(b) and those shown in FIG. 8(b), the inclination of the image is substantially beyond the influence of the position of the apex 14. In each of these cases, the distortion is well compensated for. In contrast, when the apex 14 approaches the collimation axis, as shown in FIG. 10(b), a point e''', is somewhat retracted on the horizontal direction side, as a result of which the longitudinal c''' e''' tends to be curved in a concave manner inwardly. When the apex 14 deviates remotely from the collimation axis, as shown in FIG. 11(b), a point of e''' is projected on the horizontal direction side as a result of which a longitudinal line c''' e''' tends to be somewhat curved in a concave manner outwardly. As a whole, the distortion of the visual field is well compensated for in the case of FIG. 10(b) or FIG. 11(b).

Figure 12A:
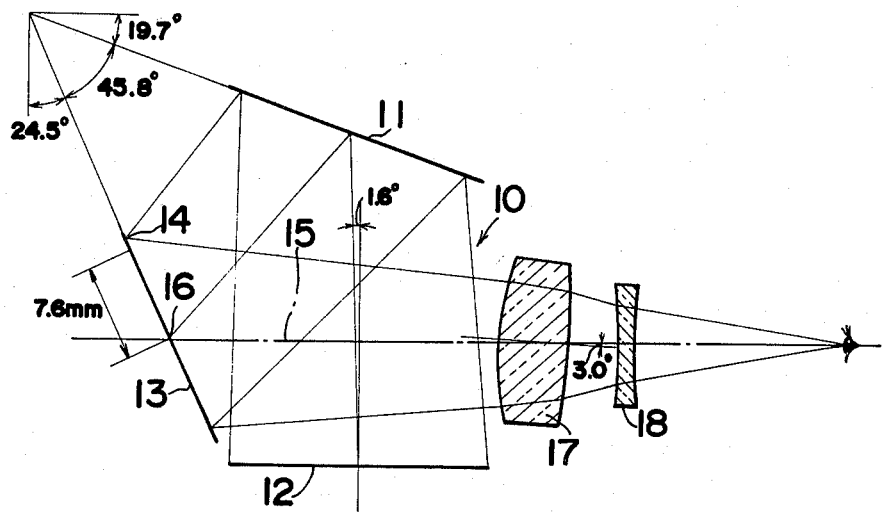

FIG. 12(a) shows a seventh embodiment of an optical system where only the convex lens 17 is arranged to have an elevation of 3.0°. In this embodiment, the other optical conditions are the same as those of the third embodiment shown in FIG. 8(a).

Figure 12B:
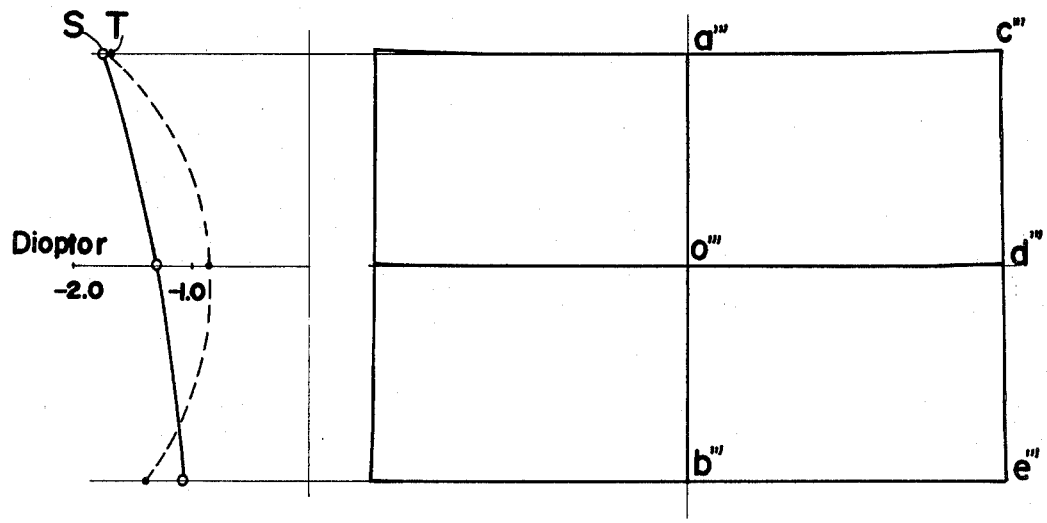

Comparing FIG. 12(b) showing the results of this embodiment with FIG. 8(b), the distortion of the visual field is compensated to the same extent as that shown in FIG. 8(b). In contrast, the image inclination tends to be somewhat deficiently compensated for in comparison with that shown in FIG. 8(b).

Obviously, the present invention is not limited to the specific embodiments shown in the Figures. For example, it is possible to use a revolution of a parabola ($\epsilon = 0$), a revolution of an ellipsoid ($0 < \epsilon \neq 1$) or a revolution of a conjugate hyperbola ($\epsilon < 0$), though any of the foregoing embodiments show the third reflecting surface is composed of the aspherical surface of $\epsilon = 1$, of a basic curved surface which is spherical.

As described above, in a viewfinder optical system using a pentagonal roof type reflecting mirror for a single lens reflex camera according to the present invention, it is possible to enlarge the magnification of the image of the pentagonal roof type reflecting mirror by the third reflecting mirror and to obtain a natural image easy to observe, in which the inclination of image and the distortion of visual field are both well compensated for a practical use.

Incidentally, it is desired that the optical system satisfies the condition $0.3 \leq La/Lp \leq 1.7$ wherein Lp is the distance from the intersection between the collimation axis and the third reflecting mirror to the uppermost point of the effective reflecting region and La is the distance from the intersection to the apex of the aspherical surface.

It is also desired that tilt angles $\theta_1$ and $\theta_2$ of the first lens group have a positive power and the second lens group has a negative lens power, both forming one ocular, and with respect to the collimation axis, satisfy the conditions of $2° \leq \theta_1 \leq 10°$ and $0 < \theta_2 \leq 5°$, respectively. If each of the tilt angles $\theta_1$ and $\theta_2$ deviated from this range, the inclination of the image becomes excessive.

Further, if the angle formed by a tangent line at the apex of the aspherical surface of the third reflecting mirror and the roof ridge line of the pentagonal roof type reflecting mirror is determined at 45° or more, the inclination of the longitudinal line of the visual field is compensated for, so that the distortion of the visual field becomes still smaller.

While the above embodiments have been disclosed as the best mode presently contemplated by the inventors, it should be realized that these examples should not be interpreted as limiting, because artisans skilled in this field, once given the present teachings, can vary from these specific embodiments. Accordingly, the scope of the present invention should be determined solely from the following claims in which we claim:

What is claimed is:

1. In a viewfinder for a single lens reflex camera to provide an object image, which includes a focussing plate onto which the object image is projected, an ocular and a pentagonal roof reflecting mirror assembly for transmitting the object image on said focussing plate to said ocular, said assembly having a cavity through which the object image is transmitted including first and second roof reflecting mirrors opposite to said focussing plate and a third mirror operatively juxtapositioned relative to said first and second roof mirrors and said ocular, the improvement comprising:

said third mirror being formed of a concave aspherical surface whose curvature is lesser at its marginal portions than at a portion adjacent to its apex, said apex being located above an intersection of said third mirror with a collimation axis of said viewfinder, and wherein said ocular is separated into at least a first convex lens group and a second concave lens group, in order from said focussing plate, at least one of said first and second lens groups being tilted to form an elevation angle with respect to said collimation axis.

2. An improvement as defined in claim 1, wherein $0.3 \leq La/Lp \leq 1.7$ is satisfied, Lp represents the distance from said intersection to the uppermost edge of the effective reflecting region of said third reflecting mirror and La represents the distance from said intersection to said apex of said aspherical surface.

3. An improvement as defined in claim 1 or 2, wherein $2° \leq \theta_1 \leq 10''$ is satisfied where $\theta_1$ represents the tilt angle of said first lens group with respect to the collimation axis.

4. An improvement as defined in claim 1 or 2, wherein $0 \leq \theta_2 \leq 5°$ is satisfied where $\theta_2$ represents the tilt angle of said second lens group with respect to the collimation axis.

5. An improvement as defined in claim 1 or 2, wherein a tangential plane at said apex of said aspherical surface intersects with the roof edge of said mirror assembly as defined by the interface formed by said first and second mirrors, at an angle greater than 45°.

6. In a pentagonal roof reflecting viewfinder for a single lens reflex camera having a focussing plate and a first and second roof reflecting mirror, the improvement comprising;

a third reflecting mirror operatively positioned relative to the first and second reflecting mirrors to transmit an image, the third mirror having an aspherical concave surface with a lesser curvature at its marginal portions than adjacent to an apex of the surface, the apex being positioned above the reflective surface of the third mirror, and an ocular formed of at least two lens elements, one of said lens elements being tilted relative to the optical axis of the ocular.

* * * * *